United States Patent
Buckingham et al.

(10) Patent No.: US 8,444,222 B2
(45) Date of Patent: May 21, 2013

(54) CHILD SAFETY SEAT ATTACHMENT BELT RETRACTOR SYSTEM

(75) Inventors: Fred Buckingham, Elkhart, IN (US); Mark E. Main, Bremen, IN (US)

(73) Assignee: AmSafe Commercial Products, Inc., Elkhart, IN (US)

( * ) Notice: Subject to any disclaimer, the term of this patent is extended or adjusted under 35 U.S.C. 154(b) by 283 days.

(21) Appl. No.: 12/756,143

(22) Filed: Apr. 7, 2010

(65) Prior Publication Data
US 2010/0253121 A1   Oct. 7, 2010

Related U.S. Application Data

(60) Provisional application No. 61/167,484, filed on Apr. 7, 2009.

(51) Int. Cl.
*A47C 1/08*  (2006.01)
*A47C 31/00*  (2006.01)

(52) U.S. Cl.
USPC .................. 297/253; 297/256.16; 297/463.1

(58) Field of Classification Search
USPC .... 297/250.1, 253, 256.16, 463.1; 242/388.1; 254/222, 223, 224, 225
See application file for complete search history.

(56) References Cited

U.S. PATENT DOCUMENTS

| | | | |
|---|---|---|---|
| 4,527,830 A | 7/1985 | Meyers | |
| 4,604,773 A * | 8/1986 | Weber et al. | 242/388.3 |
| 4,660,889 A | 4/1987 | Anthony et al. | |
| 4,679,852 A | 7/1987 | Anthony et al. | |
| 4,699,401 A | 10/1987 | Saenz | |
| 4,738,485 A | 4/1988 | Rumpf | |
| 4,785,906 A | 11/1988 | Kang | |
| 4,787,677 A | 11/1988 | Reighter | |
| 4,826,246 A | 5/1989 | Meeker | |
| 4,884,652 A | 12/1989 | Vollmer | |
| 5,031,962 A | 7/1991 | Lee | |
| 5,039,169 A | 8/1991 | Bougher et al. | |
| 5,061,012 A | 10/1991 | Parker et al. | |

(Continued)

FOREIGN PATENT DOCUMENTS

| | | |
|---|---|---|
| CA | 2086479 | 7/1993 |
| CA | 2038122 | 11/2000 |

(Continued)

OTHER PUBLICATIONS

Child Restraint Systems, Department of Aviation Administration, Federal Aviation Adm. 14 CFR.

(Continued)

*Primary Examiner* — David Dunn
*Assistant Examiner* — Philip Gabler
(74) *Attorney, Agent, or Firm* — Perkins Coie LLP (57) ABSTRACT

Retractor systems for securing child safety seats in vehicles are described herein. In one embodiment, a child safety seat includes a web operably coupled to a spool of a web retractor movably positioned under the safety seat. The web can include a first end portion that carries a first anchor connector and a second end portion that carries a second anchor connector. Rotation of the spool in a first direction retracts the first and second end portions of the web toward the retractor. Rotation of the spool in a second direction, opposite to the first direction, allows the first and second end portions to be drawn away from the retractor.

18 Claims, 8 Drawing Sheets

U.S. PATENT DOCUMENTS

| | | | |
|---|---|---|---|
| 5,143,420 A | 9/1992 | Switlik | |
| 5,219,203 A | 6/1993 | Switlik | |
| 5,233,732 A | 8/1993 | Yamanishi | |
| 5,265,828 A | 11/1993 | Bennington | |
| 5,283,933 A | 2/1994 | Wiseman et al. | |
| 5,286,090 A | 2/1994 | Templin et al. | |
| 5,377,386 A | 1/1995 | Griffith | |
| 5,383,708 A * | 1/1995 | Nagasaka et al. | 297/250.1 |
| 5,429,419 A | 7/1995 | Kassai | |
| 5,458,369 A | 10/1995 | Matsuki et al. | |
| 5,466,044 A | 11/1995 | Barley et al. | |
| 5,487,588 A | 1/1996 | Burleigh et al. | |
| 5,511,856 A | 4/1996 | Merrick et al. | |
| 5,524,928 A | 6/1996 | Monagas | |
| 5,524,965 A | 6/1996 | Barley | |
| 5,536,066 A | 7/1996 | Sedlack | |
| 5,560,565 A | 10/1996 | Merrick et al. | |
| 5,588,189 A | 12/1996 | Gorman et al. | |
| 5,605,375 A | 2/1997 | Friedrich et al. | |
| 5,606,783 A | 3/1997 | Gillis et al. | |
| 5,611,597 A | 3/1997 | Lanz | |
| 5,628,548 A | 5/1997 | Lacoste | |
| 5,669,663 A | 9/1997 | Feuerherdt | |
| 5,695,243 A | 12/1997 | Anthony et al. | |
| 5,779,319 A | 7/1998 | Merrick | |
| D397,063 S | 8/1998 | Woellert et al. | |
| 5,816,651 A | 10/1998 | Feuerherdt | |
| 5,839,793 A | 11/1998 | Merrick et al. | |
| 5,873,599 A | 2/1999 | Bauer | |
| 5,873,635 A | 2/1999 | Merrick | |
| 5,890,762 A * | 4/1999 | Yoshida | 297/256.13 |
| 5,908,223 A | 6/1999 | Miller | |
| 5,915,787 A | 6/1999 | Brookman | |
| 5,918,934 A | 7/1999 | Siegrist | |
| 5,941,601 A | 8/1999 | Scott et al. | |
| 5,970,587 A | 10/1999 | Knox | |
| 5,979,982 A | 11/1999 | Nakagawa | |
| 5,996,192 A | 12/1999 | Haines et al. | |
| 6,017,087 A | 1/2000 | Anthony et al. | |
| 6,024,408 A * | 2/2000 | Bello et al. | 297/250.1 |
| 6,030,046 A | 2/2000 | Dorow | |
| 6,082,819 A | 7/2000 | Jackson | |
| 6,139,111 A | 10/2000 | Pywell et al. | |
| 6,182,783 B1 | 2/2001 | Bayley | |
| 6,183,044 B1 | 2/2001 | Koyanagi et al. | |
| 6,209,957 B1 | 4/2001 | Baloga et al. | |
| 6,220,662 B1 | 4/2001 | Franco-Vila et al. | |
| 6,260,925 B1 | 7/2001 | Miller | |
| 6,343,837 B1 | 2/2002 | Gage | |
| 6,357,790 B1 | 3/2002 | Swann | |
| 6,402,251 B1 | 6/2002 | Stoll | |
| 6,425,632 B1 | 7/2002 | Anthony et al. | |
| 6,447,060 B1 | 9/2002 | Vila et al. | |
| 6,450,576 B1 | 9/2002 | Rhein et al. | |
| 6,463,638 B1 | 10/2002 | Pontaoe | |
| 6,517,154 B2 | 2/2003 | Sawamoto | |
| 6,540,293 B1 * | 4/2003 | Quackenbush | 297/256.13 |
| 6,543,722 B1 | 4/2003 | Parrow et al. | |
| 6,547,218 B2 | 4/2003 | Landy | |
| 6,561,588 B1 | 5/2003 | Brady | |
| 6,582,015 B2 | 6/2003 | Jessup | |
| 6,616,242 B1 | 9/2003 | Stoll | |
| 6,669,288 B2 | 12/2003 | Nakagawa et al. | |
| 6,694,577 B2 | 2/2004 | Di Perrero | |
| 6,764,135 B2 | 7/2004 | Sasaki et al. | |
| 6,767,057 B2 | 7/2004 | Neelis | |
| 6,767,058 B2 | 7/2004 | McClellan-Derrickson | |
| 6,772,973 B2 | 8/2004 | Fujii et al. | |
| 6,773,075 B2 | 8/2004 | Rouhana et al. | |
| 6,817,629 B2 | 11/2004 | Herberg et al. | |
| 6,820,310 B2 | 11/2004 | Woodard et al. | |
| 6,837,547 B2 | 1/2005 | Delventhal et al. | |
| 6,962,394 B2 | 11/2005 | Anthony et al. | |
| 6,979,057 B2 | 12/2005 | Sedlack | |
| 7,011,341 B2 | 3/2006 | Herberg et al. | |
| 7,029,067 B2 | 4/2006 | Vits et al. | |
| 7,044,548 B2 | 5/2006 | Mullen et al. | |
| 7,077,475 B2 * | 7/2006 | Boyle | 297/250.1 |
| 7,144,085 B2 | 12/2006 | Vits et al. | |
| 7,159,285 B2 | 1/2007 | Karlsson | |
| 7,159,948 B1 * | 1/2007 | Wolf | 297/463.1 |
| 7,178,208 B2 | 2/2007 | Bentsen et al. | |
| 7,201,399 B2 | 4/2007 | Frank et al. | |
| 7,246,854 B2 | 7/2007 | Dingman et al. | |
| 7,278,684 B2 * | 10/2007 | Boyle | 297/253 |
| 7,347,494 B2 | 3/2008 | Boyle et al. | |
| 7,350,767 B2 * | 4/2008 | Huang | 254/218 |
| 7,464,989 B2 | 12/2008 | Merrill | |
| 7,466,221 B1 | 12/2008 | Lehr | |
| 7,488,038 B2 | 2/2009 | Boyle et al. | |
| 7,625,048 B2 | 12/2009 | Rouhana et al. | |
| 7,673,906 B2 | 3/2010 | Bell | |
| 7,770,969 B2 | 8/2010 | Boyle et al. | |
| 7,775,557 B2 | 8/2010 | Bostrom et al. | |
| 7,861,341 B2 | 1/2011 | Ayette | |
| 7,976,092 B2 | 7/2011 | Meredith et al. | |
| 8,016,318 B2 | 9/2011 | Nezaki | |
| 8,066,303 B2 | 11/2011 | Nezaki | |
| 8,113,584 B2 | 2/2012 | Boyle et al. | |
| 2002/0000744 A1 | 1/2002 | Maciejczyk | |
| 2003/0057750 A1 | 3/2003 | Blackler | |
| 2004/0036345 A1 | 2/2004 | Herberg et al. | |
| 2005/0269846 A1 | 12/2005 | Vits et al. | |
| 2006/0038436 A1 | 2/2006 | Siewertsen et al. | |
| 2006/0049677 A1 | 3/2006 | Lawrence et al. | |
| 2006/0082129 A1 | 4/2006 | Dingman et al. | |
| 2006/0082200 A1 | 4/2006 | Woellert et al. | |
| 2006/0103200 A1 | 5/2006 | Dingman et al. | |
| 2007/0001495 A1 | 1/2007 | Boyle et al. | |
| 2007/0120001 A1 | 5/2007 | Esler et al. | |
| 2007/0210639 A1 | 9/2007 | Berger et al. | |
| 2008/0012285 A1 | 1/2008 | Holbein et al. | |
| 2008/0100051 A1 | 5/2008 | Bell et al. | |
| 2008/0100122 A1 | 5/2008 | Bell et al. | |
| 2008/0203793 A1 | 8/2008 | Boyle et al. | |
| 2009/0183348 A1 | 7/2009 | Walton et al. | |
| 2009/0278921 A1 | 11/2009 | Carter | |
| 2010/0033001 A1 * | 2/2010 | Boyer | 297/253 |
| 2010/0201170 A1 | 8/2010 | Brandl et al. | |
| 2010/0213753 A1 | 8/2010 | Humbert | |
| 2010/0219667 A1 | 9/2010 | Humbert et al. | |

FOREIGN PATENT DOCUMENTS

| | | |
|---|---|---|
| CA | 2038505 | 11/2000 |
| CA | 2450995 | 12/2003 |
| CA | 2551335 | 12/2006 |
| DE | 19738430 | 3/1999 |
| EP | 0552570 | 12/1992 |
| EP | 0560184 | 9/1993 |
| EP | 0462930 | 8/1994 |
| EP | 0619201 | 10/1994 |
| EP | 0619202 | 10/1994 |
| EP | 0646491 | 4/1995 |
| EP | 0703113 | 3/1996 |
| EP | 0714806 | 6/1996 |
| EP | 0841209 | 5/1998 |
| EP | 0970842 | 1/2000 |
| EP | 0982182 | 1/2000 |
| EP | 1059194 | 12/2000 |
| EP | 1193111 | 4/2002 |
| EP | 1231100 | 8/2002 |
| EP | 1472949 | 11/2004 |
| EP | 1547484 | 6/2005 |
| EP | 1631166 | 9/2008 |
| JP | 5254367 | 10/1993 |
| JP | 10119611 | 5/1998 |
| JP | 10119612 | 5/1998 |
| JP | 2001030811 | 2/2001 |
| JP | 2005178513 | 7/2005 |
| JP | 4604482 | 1/2011 |
| WO | WO03009717 | 2/2003 |
| WO | WO03010024 | 2/2003 |
| WO | WO03010035 | 2/2003 |
| WO | WO2005000625 | 1/2005 |
| WO | WO2005037605 | 4/2005 |
| WO | WO2005102112 | 11/2005 |
| WO | WO2006044559 | 4/2006 |

| | | |
|---|---|---|
| WO | WO2006044627 | 4/2006 |
| WO | WO-2006044809 | 4/2006 |
| WO | WO2006044830 | 4/2006 |
| WO | WO2012/037398 | 3/2012 |

OTHER PUBLICATIONS

Improving the Safety of Older Child Passengers, Nov. 2005.
Restraint Use on Aircraft, American Academy of Pediatrics vol. 108, No. 5, Nov. 2001.
Safefit, Cover N' Carry Car Seat Protector, www.Amazon.com.
Safer Airplane Travel with Babies & Toddlers, www.saferidenews.com.
Tiny Air Travelers at Risk, Brad Watson Reports, Jan. 26, 2006.
Ultimate Black Car Seat Travel Bag, www.target.com.
Wheelie Car Seat Travel Bag by JL Childress, www.Go-Baby.com.

* cited by examiner

Fig. 10

CHILD SAFETY SEAT ATTACHMENT BELT RETRACTOR SYSTEM

CROSS-REFERENCE TO RELATED APPLICATION(S) INCORPORATED BY REFERENCE

The present application claims priority to U.S. Provisional Patent Application No. 61/167,484, filed Apr. 7, 2009, and entitled "CHILD SAFETY SEAT ATTACHMENT BELT RETRACTOR SYSTEM," which is incorporated herein in its entirety by reference.

BACKGROUND

The field of the invention is child and infant safety seats. More, specifically the invention relates to devices and methods for securely attaching a child or infant safety seat, or seat base, to latch anchors in a vehicle.

In the past, child safety seats were secured in automobiles using the standard factory-installed shoulder and lap seat belts of the automobile. These belts were routed or threaded in or around the child safety seat and latched in the usual manner. However, due the various types of child car seats, and the various types of seat and should belts, securing a child seat properly could require significant time and effort by a parent. National Highway Traffic Safety Administration (NHTSA) determined that child seats were very often improperly secured, posing serious risks to children.

In response, several years ago, a new system, known as LATCH (Lower Anchors and Tethers for Children) was developed to simplify installation of child seats. This system uses attachment belts designed for the child seat, to secure the seat to anchors that are permanently attached to the vehicle. The anchors are steel rings or loops. The attachment belts have hooks or other fittings that attach to the anchors. The factory-installed seat belts are not used to secure the child seat. Although hooks may be used with the LATCH system, hoods have several disadvantages. Hooks can be difficult to engage and disengage a hook from the anchors. The lower anchors are sometimes buried between the automobile seat cushions, and are not easily visible. This can make it difficult to maneuver the hook onto an anchor, or to release the hook from the anchor. Various attachment belt end fittings or devices have been proposed to simplify use of the LATCH system. These devices generally use a plug-in/latching movement, or simple push-in or pull-out movement, to engage and disengage the anchor, eliminating the problems associated with hooks.

Various devices have also been used to take up slack in the attachment belts and to hold the seat firmly in place. These include manual devices such as slider and friction devices, and automatic devices such as spring driven retractors. However, existing retractor systems have disadvantages relating to design, operation and mounting characteristics. Accordingly, various engineering challenges remain in designing a versatile, reliable yet easy to use attachment system for a child seat.

SUMMARY

In a first aspect, a child safety seat includes a retractor movable laterally in or along a retractor track. The retractor track may be on a bottom or down-facing surface of the seat, or seat base. The retractor track may be a separate component, or it may be integrally formed with the seat or seat base. A belt or web extends through the retractor and is retractable onto a spool in the retractor. First and second latch devices are attached onto first and second sections of the web. The latch devices latch onto anchors in a vehicle to hold the child safety seat or seat base securely in the vehicle. Since the retractor is mounted under the seat or seat base, it provides a compact design. In addition, a single retractor may be used for both sections of the web. This can simplify the overall design and operation of the attachment belt retractor system. A single retractor may also allow less spool-out under loaded conditions.

In a second aspect, the retractor track may be omitted, with the retractor suspended via the belt. In a third aspect, the track may be omitted and the retractor may be located off or outside of the safety seat, for example, on one of the latch devices. In a fourth aspect, only a single retractor is used. In a fifth aspect, the retractor is an auto lock retractor and remains constantly in a locked position to prevent payout, unless the retractor is released. The retractor may be used with front or rear facing safety seats, with or without a separate base.

In a sixth aspect, a ratchet mechanism associated with the spool is moveable between a first position, wherein the ratchet mechanism is engaged with the spool and prevents reverse direction rotation of the spool, and a second position wherein the ratchet mechanism is disengaged from the spool and the spool is free to rotate in a forward direction or in a reverse direction. The ratchet mechanism automatically takes up slack in the web sections. A ratchet spring may bias the ratchet mechanism into the first position. A release line or device may be attached to the ratchet mechanism for pulling the ratchet mechanism into the second position, to allow the web sections to be pulled out from the retractor, during installation and/or removal of the child safety seat or seat base.

BRIEF DESCRIPTION OF THE DRAWINGS

In the drawings, the same reference number indicates the same element, in each of the views.

DETAILED DESCRIPTION OF THE DRAWINGS

The systems, devices and methods described here may be used in various types of vehicles, and especially automobiles having LATCH anchors. They can also be used with various types of child and infant safety seats, front or rear facing, booster seats, stroller seats, and with seats including a separate base.

Figure 1:
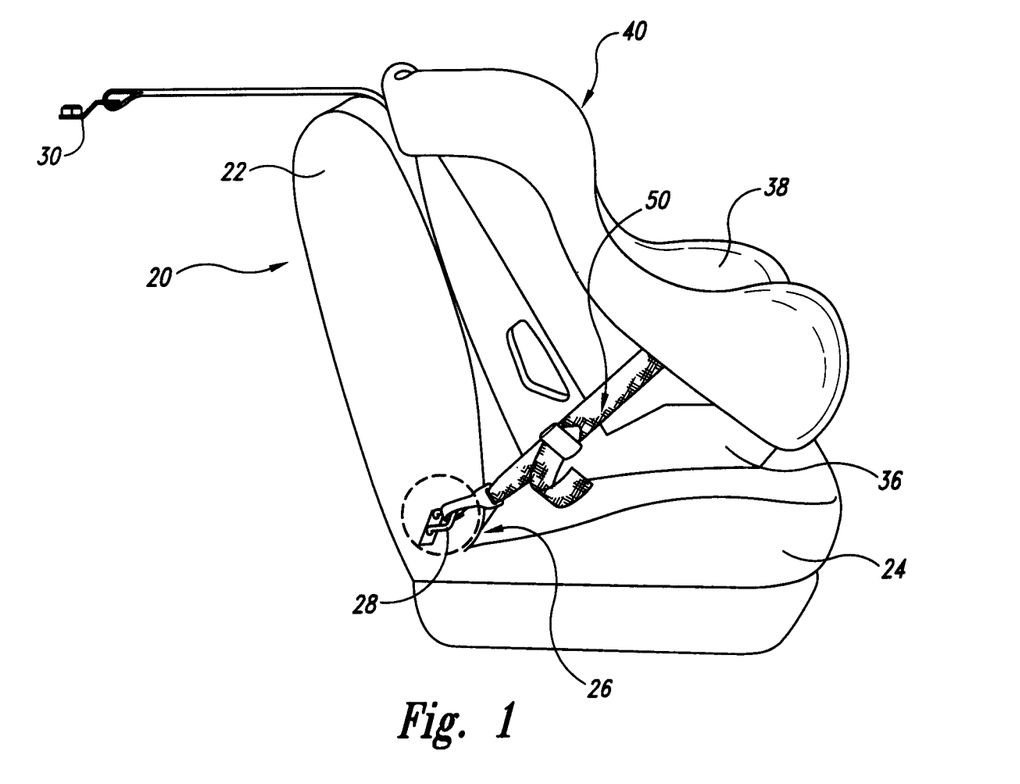
FIG. 1 is a side perspective view of a child seat section and seat base secured within a vehicle using the present child safety seat attachment belt retractor system.
Figure 1A:
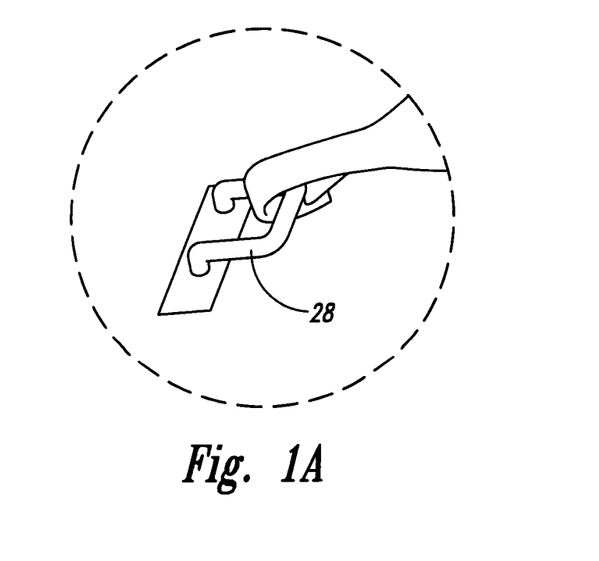
FIG. 1A is a perspective view of an anchor as permanently installed in the vehicle.

As shown in FIGS. 1 and 1A, anchors 28 are attached to one or more structural surfaces within the vehicle. The lower anchors 28 may be at or within the crease 26 formed between the back cushion 22 and the bottom cushion 24 of the vehicle seat 20. Regardless of location, the lower anchors 28 are generally permanently attached (e.g., bolted, welded, etc.) to the vehicle, and are generally formed as a steel squared off U-shaped ring or loop. The upper anchor 30 is generally attached to a deck behind the vehicle seat 20, to secure a tether leaving the top of the back of a child seat 38. In some vehicles such as SUV's or vans, the upper anchor 30 may be attached to a floor or roof surface.

Figure 2:
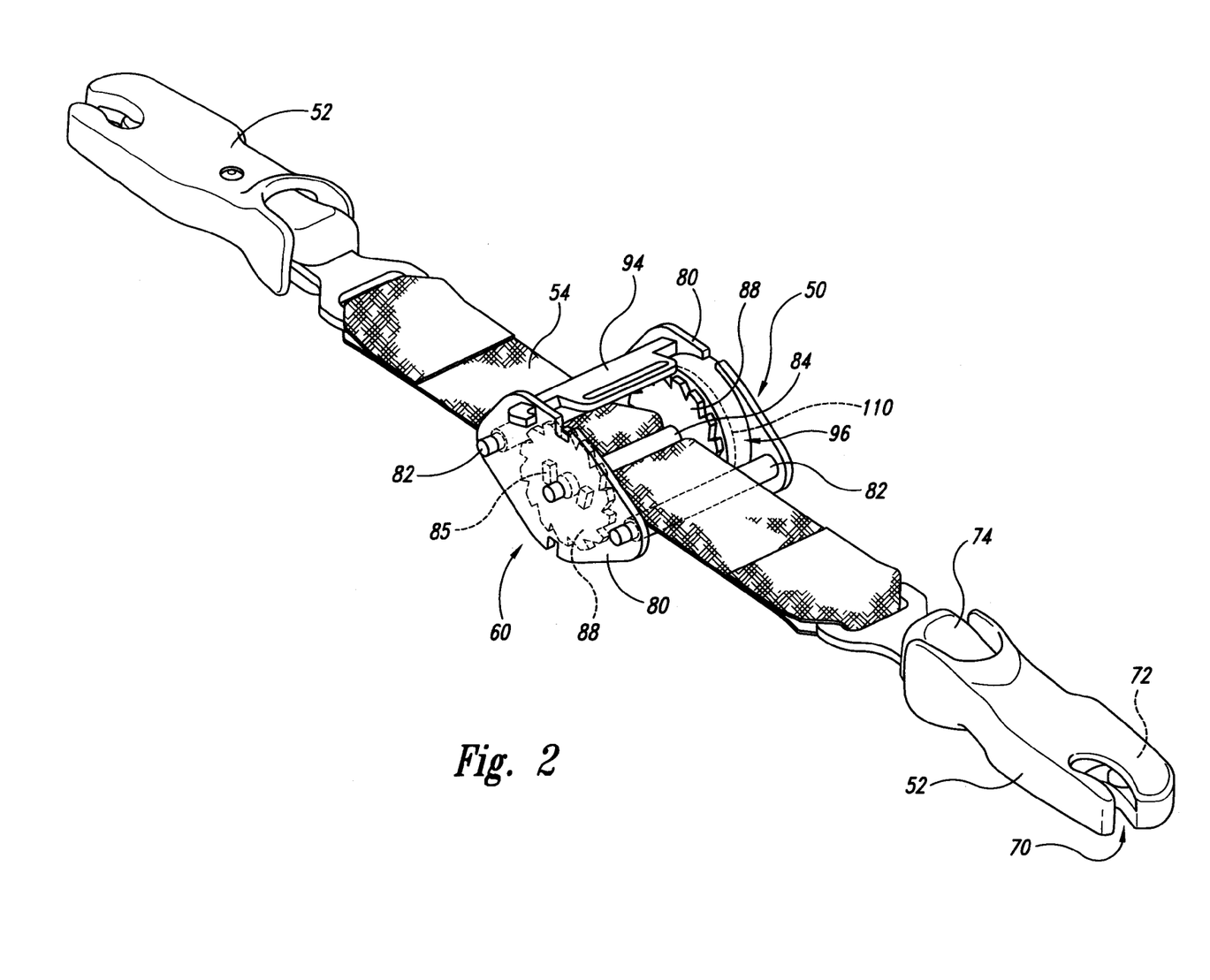
FIG. 2 is a perspective view of a first embodiment of the retractor system shown separately.

Turning to FIG. 2, in one design, a latch belt unit or assembly 50 includes first and second latches 52 each attached to a length of seat belt or web 54. The web 54 extends through a retractor 60. The retractor 60 is supported or suspended on the web 54. The retractor 60 is otherwise not attached to the seat section 40 or the base section 36 of the child seat 38. The latches 52 may be multi-pivot latch assemblies, as described for example in U.S. patent application Ser. Nos. 12/060,095, 12/415,906, and 12/485,778, which are incorporated herein by reference. Alternatively, the latches 52 may be other devices adapted to lock onto and release from the anchors 28. Hooks may be also be used in place of the latches 52. In the specific example shown in FIG. 2, the latches 52 have a slot 70 for engaging over and around an anchor 28, an internal mechanism 72 for locking onto the anchor, and a pull-back release 74, for reversing the mechanism 72 to release the latch 52.

Figure 3:
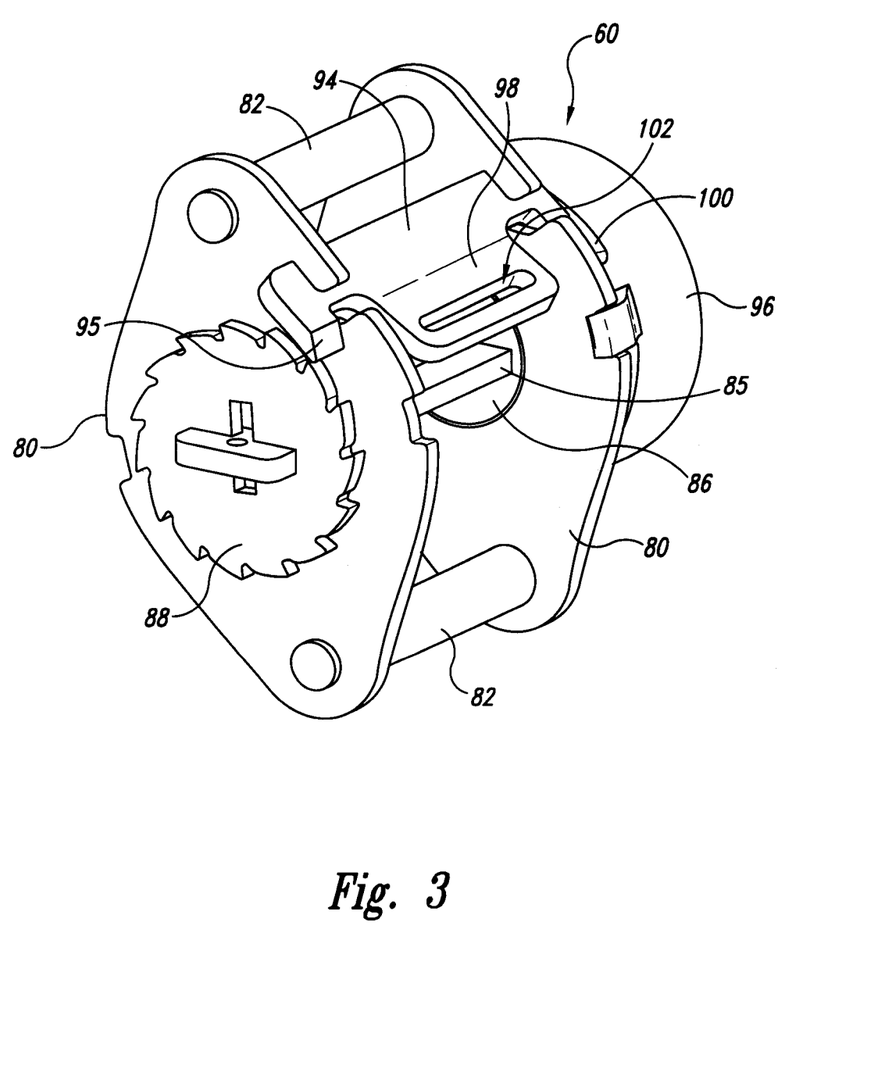
FIG. 3 is a front perspective view of the retractor shown in FIG. 2.
Figure 4:
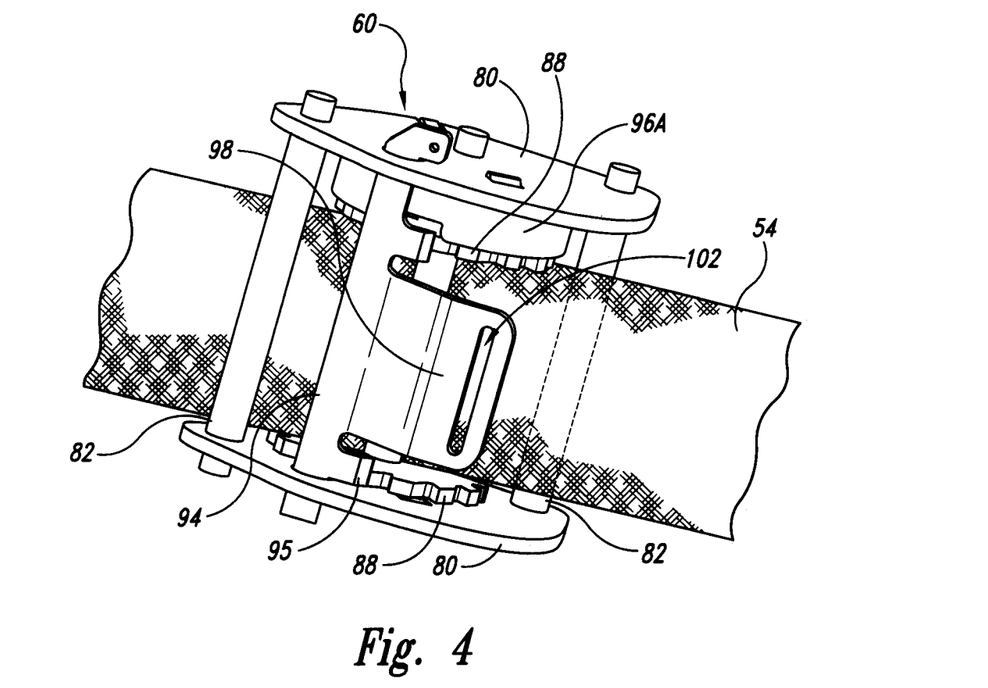
FIG. 4 is a top perspective view of the retractor and belt section shown in FIG. 2
Figure 5:
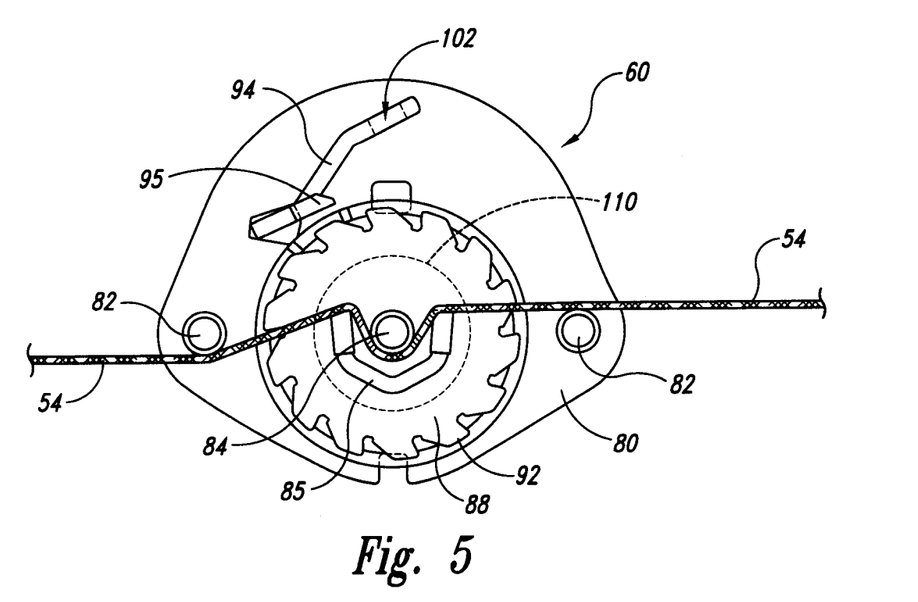
FIG. 5 is a section view of the retractor shown in FIGS. 2-4, although with the web fully paid out.

As shown in FIGS. 3, 4 and 5, the retractor 60 has first and second side plates 80 connected via spacer bars 82. A cylinder bar 84 extends between the side plates 80 and is rotatably supported on bushings 86 attached to the side plates 80. First and second ratchet wheels 88 are attached to the outer ends of the cylinder bar 84, adjacent to the side plates 80. The ratchet wheels 88 have multiple evenly spaced apart ratchet teeth 92. The ratchet wheels 88 may be on the inside or on the outside of the side plates 80. The ends of a cylinder bar guide 85 are attached to the ratchet wheels. The cylinder bar guide 85 partially surrounds the cylinder bar 84. The sides of the cylinder bar guide 85 extend up to a position about tangent to the top surface of the cylinder bar 84, as shown in FIG. 5. The cylinder bar guide 85 rotates with the ratchet wheels 88. As the ratchet wheels rotate, the cylinder bar guide 85 causes the web sections to wind up around the cylinder bar guide, from both sides. FIG. 5 shows the web sections fully paid out, for purpose of illustration. In a typical use, some length of the web sections would be wound up around the cylinder bar.

The web 54 extends into the retractor 60 over the first spacer bar 82, winds around the cylinder bar 84 to form a spool of web, and extends out of the retractor 60 under the second spacer bar 82. A cylinder bar spring 110 is attached to the second side plate 80 within a spring cup 96. The spring 110 and spring cup 96 may be on the inside of the plate 80, as shown in FIG. 2, or on the outside of the plate 80, as shown in FIG. 3. The spring 110 applies torque to the cylinder bar 84 in a direction tending to wind in the web sections 54, on both sides of the retractor 60. Consequently, the spring 110 causes any slack in the web sections 54 to be taken up, keeping the web moderately taut. The web sections may both be part of a continuous single length of web running through the retractor, as shown in FIG. 5. The web may optionally run through a slot in the cylinder bar guide 85, although no slot is needed. The cylinder bar 84 and cylinder bar guide 85 may also of course be replaced with a spool joined to the ratchet wheels, with the web passing through or otherwise attached onto the spool.

As best shown in FIGS. 3 and 4, a pawl bar 94 is pivotally supported in slots in the side plates 80. A pawl spring 100, shown in FIG. 3, biases the pawl bar 94 to engage pawl teeth 95 at each end of the pawl bar with the ratchet wheels 88. This engagement between the pawl teeth 95 and the teeth 92 on the ratchet wheels 88 ordinarily prevents reverse or unwinding movement of the cylinder bar 84. A tab extension 98 on the pawl bar 94 has a slot 102. A release tether or belt 58 (shown in FIG. 7) looped through the slot 102 is used to pull the pawl bar 94 upward or outward, to release the pawl teeth 95 from the ratchet wheels 88. This releasing movement temporarily allows reverse rotation of the cylinder bar 84, so that the web sections 54 can be pulled out as needed while securing the child seat 38 or seat base 36 into the vehicle. Various release devices may be used in place of the release belt 58. These may include mechanical linkages that release the retractor to allow pay out. The mechanical linkages may include a lever, button, knob or other element used to release the retractor.

Some child seats 38 have a seat section 40 that can be separated from a base 36. This allows the base 36 to remain secured in place in the vehicle, while the seat section 40 is removed for carrying an infant, or for placement into a convertible stroller. Use of the separate base 36 avoids the need to secure and release the seat attachments from the vehicle each time the seat section 40 is removed from the vehicle. It also reduces the size and weight of the seat section 40, when the seat section is used separately outside of the vehicle. The latch belt units described here may be used with either a seat 38 or a seat base 36.

Figure 6:
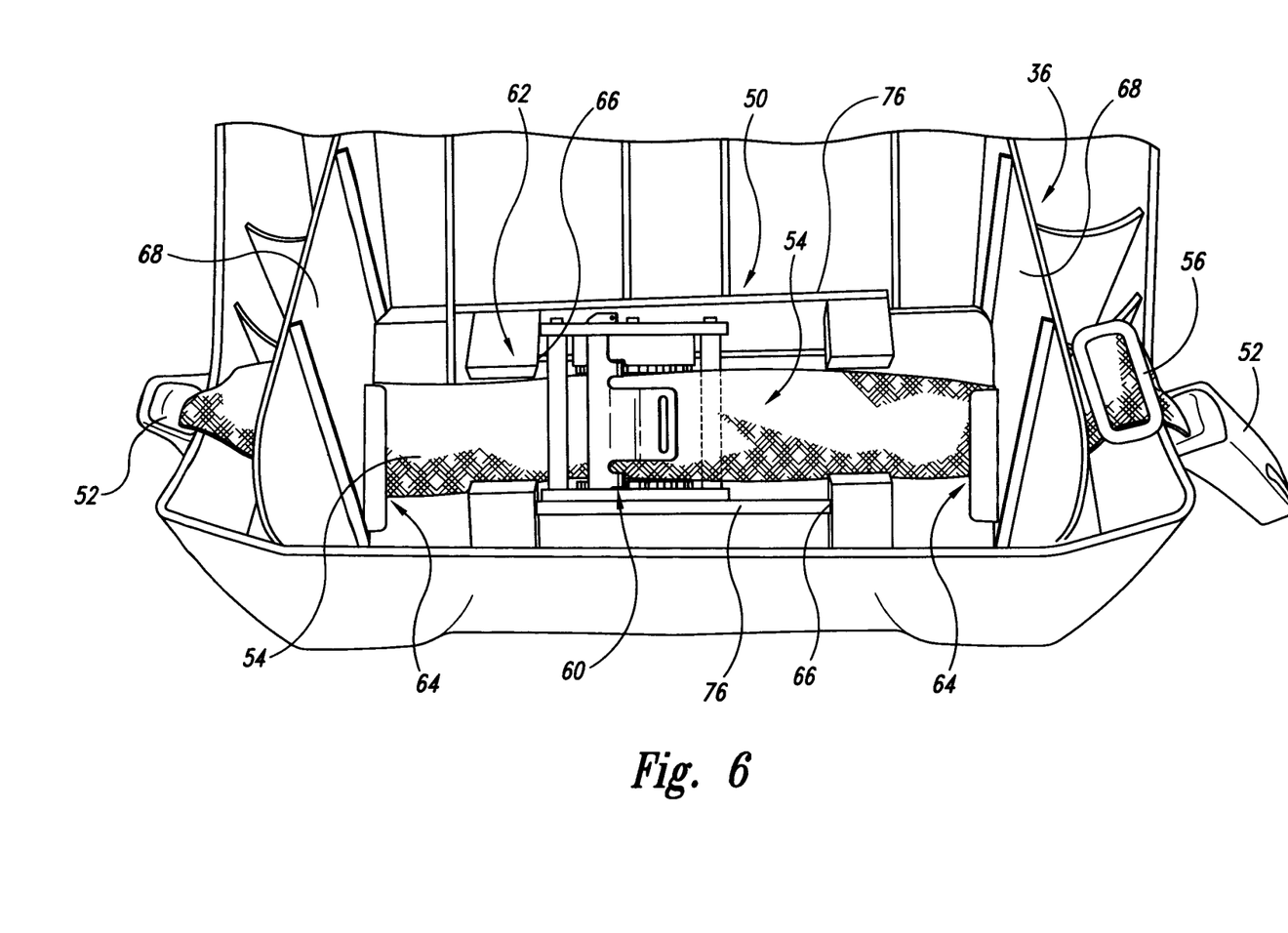
FIG. 6 is a bottom perspective view of the retractor system of FIG. 2 installed in the base of a child seat.
Figure 7:
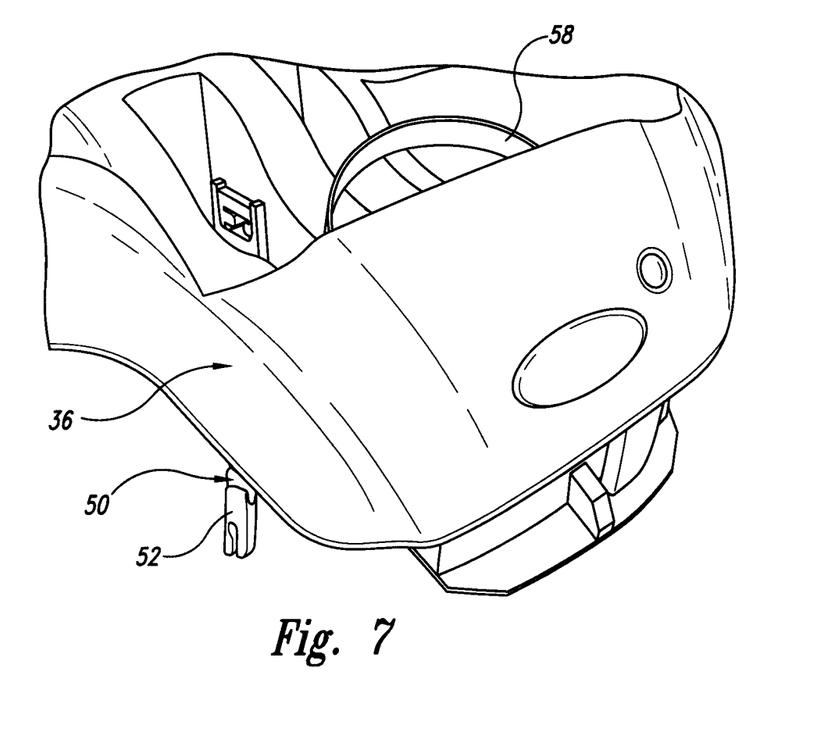
FIG. 7 is a partial front and side perspective view of the seat base shown in FIG. 6, with the seat section removed from the seat base.
Figure 8:
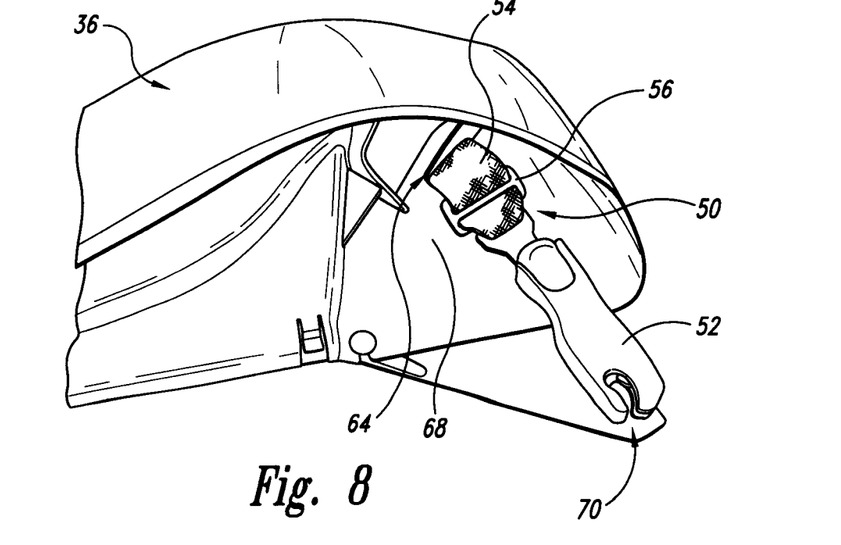
FIG. 8 is a partial perspective side view of seat base shown in FIGS. 6 and 7.

FIGS. 6, 7 and 8 show the latch belt unit 50 as it might be ordinarily installed on a base 36 of a child seat 38. FIG. 2 on the other hand shows the latch belt unit 50 apart from any base or child seat. However, FIG. 2 is presented only to more clearly show the components of the latch belt unit 50, rather than showing an actual installation or use of the latch belt unit 50.

Figure 10:
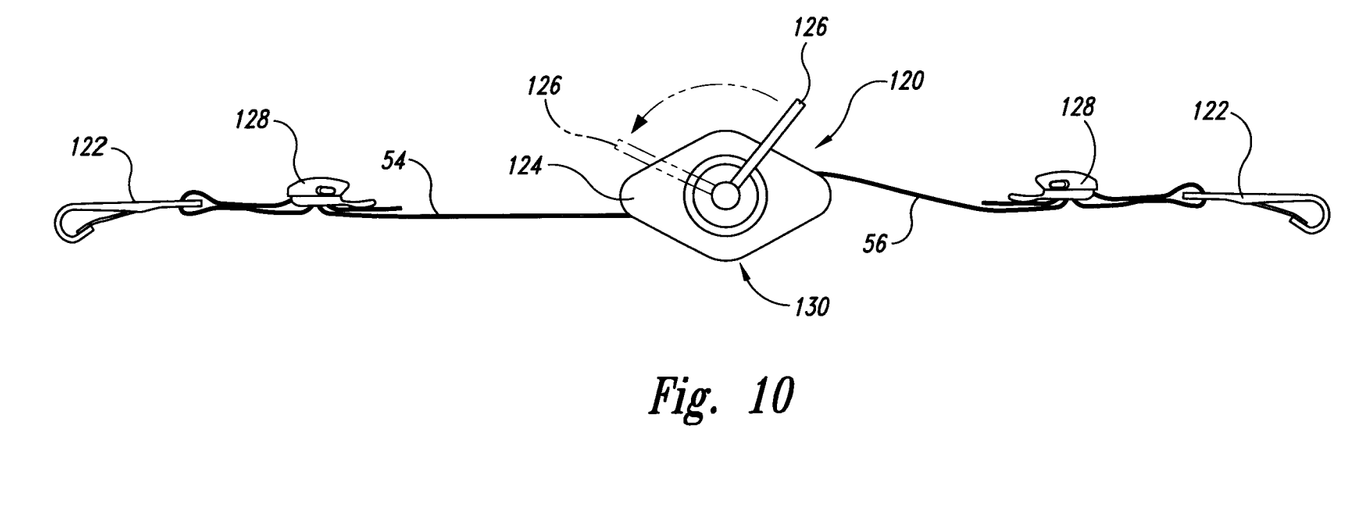
FIG. 10 is a side view of another embodiment of the retractor system.

FIG. 6 shows the underside of the seat base 36 including the latch belt unit 50. The retractor 60 is positioned within or below a generally rectangular retractor track 62. The web sections 54 extend out through slots 64 in the inner sidewalls 68 of the base 36. Latch devices 52 are attached to the outer free ends of the web sections 54. Since the latch devices 52 typically are too large to fit through the slots 64, they are attached to the web sections 54 after the latch belt unit 50 is installed into the seat base 36. FIG. 6 shows the latch devices 52 attached via a locking clip or slider 56. However, other attachments, such as stitching, bonding, fastening, etc. may also be used. Alternatively, the slots 64 may be made large enough to allow the latch devices 52 to pass through the sidewalls 68, allowing a fully assembled latch belt unit 50 to be installed without subsequently separately attaching the latch devices 52 to the web sections 54. Hooks 122 as shown in FIG. 10 may also be used in place of the latch devices 52.

Referring still to FIG. 6, the retractor track 62 extends laterally within the base 36, typically with a length of about 4-12 or 6-10 inches. The retractor 60 is movable side-to-side relative to the track. The retractor 60 is generally held within the track 62 by the web sections 54. The retractor 60 is not attached to the track 62 or to any part of the base 36. The track 62 has parallel front and rear walls 76 that may confine the retractor 60 and help to keep the retractor 60 aligned (with the axis of the cylinder bar 84 perpendicular to the walls 76. The track 62 may also have left and right side stops 66 to limit movement of the retractor 60. Alternatively, the inner sidewalls 68 may act as stops to limit movement of the retractor 60. In some designs, the track may be omitted, with the retractor suspended by the web in a recess or space under the seat or base. The retractor may also be external to the seat, e.g. associated with a latch device.

FIG. 8 shows the right side of the seat base 36. The right side web section 54 passes through the slot 64 in the right inner sidewall 68. The latch device 52 is attached to and suspended by the right side web section 54. The left side of the seat base 36 may have the same configuration. FIG. 7 shows the top of the seat base 36, without the seat section 40 in place. The retractor release belt 58 passes through the slot 102 in the pawl bar 94 and through slots in the floor of the seat base 36. A similar set up may be used with child seat 38 not having a separate base 36, or with other types of child seating, pet seating, restraints or enclosures, or with other general cargo containers to be secured onto a passenger seat in a vehicle. This design may be used for a boat trailer tie down or an ATV tow strap.

In use, the seat base 36 as shown in FIG. 6 is placed on the passenger seat 20 in a vehicle. One latch device 52, e.g., a right side latch device, is pulled out from the base 36 and latched onto an anchor 28. The slack in the web section 54 needed to pull out the latch device can be obtained via the retractor sliding to the right side of the track 62. Since use of the release belt 58 may not be needed in this initial installation step, the installer may have both hands free to attach the right side latch onto an anchor.

To attach the left side latch device 52 to an anchor 28, some slack is needed in the left side web section 54. This slack may be obtained by pressing the seat base 36 firmly down into the passenger seat 20, e.g., via the installer's knee. Slack or length on the left side may also be obtained by pulling on the left side web section, to tighten up the right side web section, and to move the retractor 60 towards the left side of the seat base 36. Additional slack, if needed, may be obtained by pulling up on the release belt 58. This pulls the pawl bar 95 out of engagement from the ratchet wheels 88, to allow the web 54 to unwind from the spool, as may be needed. As spool unwinds, web is payed out from both sides of the retractor. When the installer releases the release belt 58, the spring 100 moves the pawl bar 95 back into engagement with the ratchet wheels 88.

After the left side latch device 52 is attached to an anchor, the spring 110 in the retractor 60 turns the cylinder bar 84 to take up any slack in the web sections. With the pawl bar 94 re-engaged with the ratchet wheels 88, the web sections 54 can only retract into the retractor, and cannot be pulled out or extended. With both latch devices 52 latched onto an anchor 28, the base 36 may be momentarily pressed down into seat 20. As this occurs, the retractor automatically draws in the web sections 54, securing the seat base 36 in place. The child seat 38 is then engaged onto the base 36 and is then ready for use. The seat base 36 may be removed from the vehicle using a reverse sequence of steps, although little if any slack is needed in removing the base, unless hooks are used.

FIG. 10 shows an alternative latch belt unit 120 using hooks 122 and friction length adjusters 128 on the web sections 54. The retractor 130 of the latch belt unit 120 may be the same as the retractor 60, but further includes a ratchet handle or lever 126 attached to or engagable with a ratchet wheel 88 or to the cylinder bar 84. The handle 126 allows one or both of the web sections 54 to be forcefully coiled onto the cylinder bar 84 to tightly tension the web sections 54 and secure a base or seat in place. The ratchet handle may be spring biased to return to an initial position shown in solid lines in FIG. 10, after temporarily engaging and rotating the ratchet wheel 88 to tighten the web sections 54.

Figure 9:
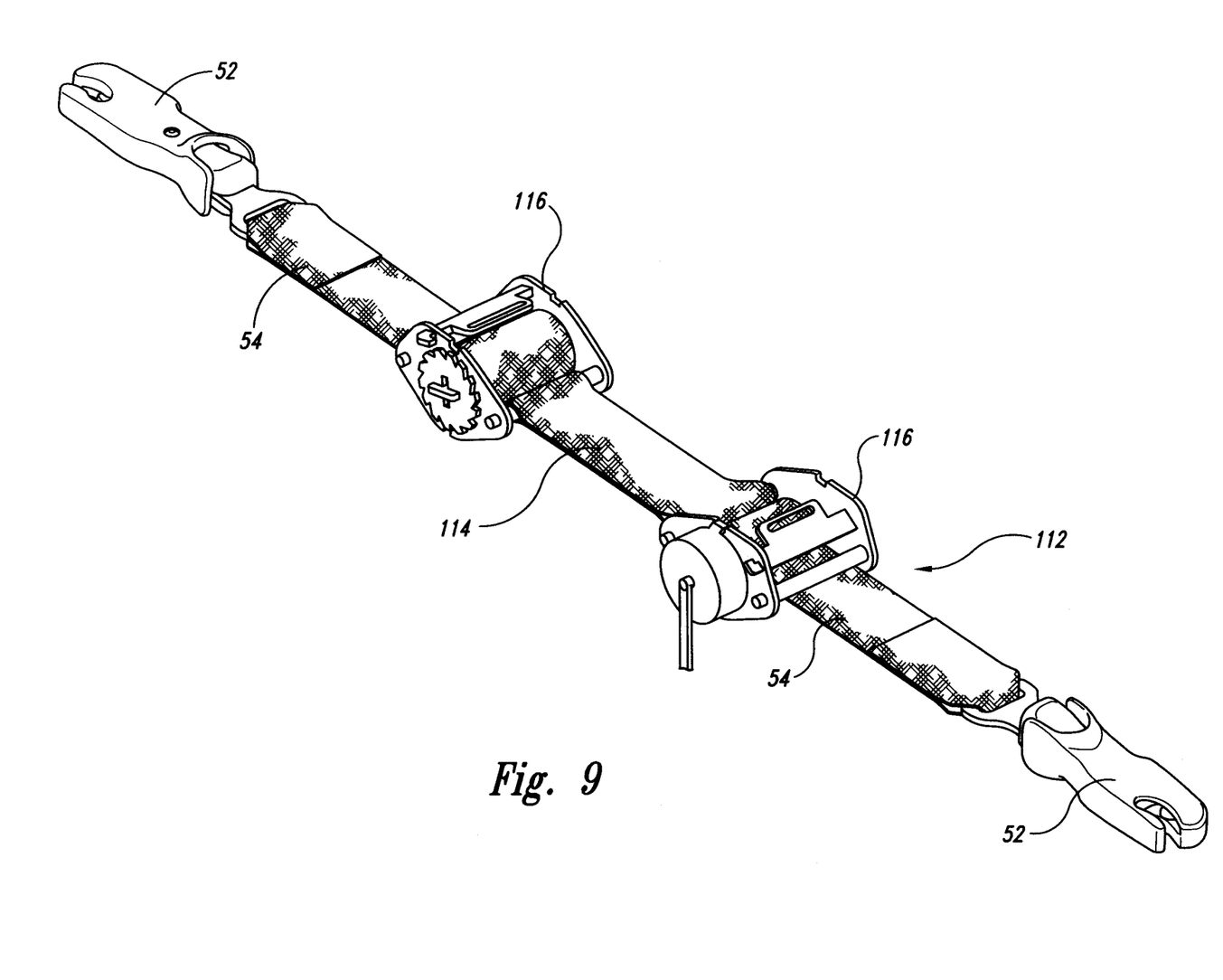
FIG. 9 is a perspective view of a second embodiment of the retractor system also shown separately.

FIG. 9 shows another latch belt unit 112 having two retractors 116 connected by a fixed length of web 114. The retractors 116 retract a single web section 54, rather than retracting two web sections as in the retractor 60 shown in FIG. 2. Any of the retractors shown may optionally include the ratchet handle 126 feature shown in FIG. 10.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A child safety seat comprising:
a seat base; a retractor track positioned below a bottom surface of the seat base
a retractor movable laterally in the retractor track, the retractor including a rotatable spool, wherein the retractor track includes a front wall and a rear wall to maintain alignment of the retractor, and wherein the retractor is movably positioned between the front and rear walls;
a web extending through the retractor and having first and second web sections, with the web retractable onto the spool in the retractor; and
first and second latch devices attached to the first and second web sections, respectively.

2. The child safety seat of claim 1 wherein the retractor further includes a ratchet mechanism associated with the spool, and wherein the ratchet mechanism is moveable between a first position in which the ratchet mechanism is engaged with the spool and prevents reverse direction rotation of the spool, and a second position in which the ratchet mechanism is disengaged from the spool and permits reverse and forward direction rotation of the spool.

3. The child safety seat of claim 2 wherein the retractor further includes a ratchet spring biasing the ratchet mechanism into the first position, and wherein the child safety seat further comprises a release line attached to the ratchet mechanism for pulling the ratchet mechanism into the second position.

4. The child safety seat of claim 3, wherein the release line extends through the bottom surface of the seat base.

5. The child safety seat of claim 1, further comprising a handle operably coupled to the spool for manually retracting the web onto the spool.

6. The child safety seat of claim 1, wherein the retractor further comprises a spool spring applying torque to the spool in a first direction to simultaneously retract both the first and second web sections.

7. The child safety seat of claim 1 wherein the retractor is configured to automatically retract at least one of the first and second web sections onto the spool to fully tighten the web sections in use.

8. The child safety seat of claim 1 wherein the retractor is configured to automatically retract the first and second web sections onto the spool to fully tighten the web sections in use.

9. A child safety seat comprising:
a seat base having a retractor track positioned below a bottom surface of the seat base;

a web having a first end portion and a second end portion;

a retractor operably coupled to the web, wherein the retractor is movable from side to side in the retractor track, wherein the retractor track includes a front wall and a rear wall to maintain alignment of the retractor, wherein the retractor is movably positioned between the front and rear walls, wherein operation of the retractor in a first direction retracts the first and second end portions of the web toward the retractor, and wherein operation of the retractor in a second direction pays out the first and second end portions away from the retractor;

a first latch attached to the first end portion of the web and configured to releasably engage a first anchor fixedly attached to a vehicle; and a second latch attached to the second end portion of the web and configured to releasably engage a second anchor fixedly attached to the vehicle.

10. The child safety seat of claim 9 wherein the web includes a first web section having the first end portion and a second web section having the second end portion, wherein the first web section extends outwardly from the retractor in a first direction and the second web section extends outwardly from the retractor in a second direction opposite to the first direction.

11. The child safety seat of claim 9 wherein the retractor includes a rotatable spool, and wherein rotation of the spool in a first direction simultaneously retracts the first and second end portions of the web toward the retractor, and wherein rotation of the spool in a second direction simultaneously pays out the first and second end portions away from the retractor.

12. The child safety seat of claim 9 wherein the web includes a first web section having the first end portion and a second web section having the second end portion, and wherein the retractor includes means for simultaneously winding the first and second end portions of the web onto a spool associated with the retractor.

13. The child safety seat of claim 9 wherein the web includes a first web section having the first end portion and a second web section having the second end portion, and wherein the retractor includes:
  means for simultaneously winding the first and second end portions of the web onto a spool associated with the retractor;
  means for automatically locking the spool; and
  means for manually releasing the spool.

14. A child safety seat comprising:
  a web having a first web section and a second web section, wherein the first web section has a first end portion and the second web section has a second end portion;
  a retractor operably coupled to the web, wherein operation of the retractor in a first direction retracts the first and second end portions of the web toward the retractor, and wherein operation of the retractor in a second direction pays out the first and second end portions away from the retractor;
  a first latch attached to the first end portion of the web and configured to releasably engage a first anchor fixedly attached to a vehicle;
  a second latch attached to the second end portion of the web and configured to releasably engage a second anchor fixedly attached to the vehicle; and
  a seat base having a retractor track positioned between a first opening and second opening, wherein the retractor is movably positioned in the retractor track with the first web section extending through the first opening and the second web section extending through the second opening.

15. The child safety seat of claim 14 wherein the first opening is in a first sidewall of the seat base and the second opening is in a second sidewall of the seat base, and wherein the retractor is movably positioned between the first and second sidewalls with the first web section extending through the first opening and the second web section extending through the second opening.

16. A child safety seat for use in a vehicle, the safety seat comprising:
  a seat frame, wherein the seat frame includes a retractor track positioned between a first sidewall and a second sidewall;
  a web having a first web section with a first end portion and a second web section with a second end portion;
  a first latch attached to the first end portion of the web and configured to releasably engage a first anchor fixedly attached to the vehicle;
  a second latch attached to the second end portion of the web and configured to releasably engage a second anchor fixedly attached to the vehicle;
  a retractor having a spool operably coupled to the web, wherein the retractor is movably positioned in the retractor track between the first and second sidewalls;
  a biasing member applying torque to the spool in a first direction to simultaneously retract both the first and second web sections onto the spool; and
  a release mechanism associated with the spool, wherein the release mechanism is moveable between a first position in which the release mechanism prevents rotation of the spool in a second direction, opposite to the first direction, and a second position in which the release mechanism permits rotation of the spool in the first and second directions.

17. The child safety seat of claim 16 wherein the first sidewall is spaced apart from the second sidewall, wherein the first sidewall includes a first opening and the second sidewall includes a second opening, and wherein the first web section extends through the first opening in the first sidewall and the second web section extends though the second opening in the second sidewall.

18. The child safety seat of claim 16 wherein the biasing member applies torque to the spool in the first direction to automatically retract both the first and second web sections onto the spool.

* * * * *

UNITED STATES PATENT AND TRADEMARK OFFICE
CERTIFICATE OF CORRECTION

PATENT NO. : 8,444,222 B2
APPLICATION NO. : 12/756143
DATED : May 21, 2013
INVENTOR(S) : Fred Buckingham et al.

It is certified that error appears in the above-identified patent and that said Letters Patent is hereby corrected as shown below:

On Title Page 2, in column 1, item (56), under "U.S. Patent Documents", line 29, delete "Bauer" and insert -- Bauer et al. --, therefor.

On Title Page 2, in column 1, item (56), under "U.S. Patent Documents", line 50, delete "Swann" and insert -- Swann et al. --, therefor.

In the Claims:

In column 6, line 24, in claim 1, delete "base" and insert -- base; --, therefor.

Signed and Sealed this
First Day of October, 2013

Teresa Stanek Rea
*Deputy Director of the United States Patent and Trademark Office*